United States Patent
Pratt et al.

(10) Patent No.: US 7,406,365 B2
(45) Date of Patent: Jul. 29, 2008

(54) POWER MANAGER WITH SELECTIVE LOAD REDUCTION

(75) Inventors: Annabelle Pratt, Hillsboro, OR (US);
Eugene Gorbatov, Hillsboro, OR (US);
Pavan Kumar, Portland, OR (US);
Tomm V. Aldridge, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 302 days.

(21) Appl. No.: 11/396,190

(22) Filed: Mar. 31, 2006

(65) Prior Publication Data

US 2007/0228832 A1 Oct. 4, 2007

(51) Int. Cl.
G05D 3/12 (2006.01)
G05D 5/00 (2006.01)
G05D 9/00 (2006.01)
G05D 11/00 (2006.01)
G05B 11/01 (2006.01)
G06F 1/00 (2006.01)

(52) U.S. Cl. ............ 700/295; 700/22; 713/324
(58) Field of Classification Search ............ 700/22, 700/286, 291, 295–298; 713/300, 320, 322–324, 713/401; 307/9.1, 10.1, 141, 409
See application file for complete search history.

(56) References Cited

U.S. PATENT DOCUMENTS 5,560,022 A * 9/1996 Dunstan et al. ............ 713/300
6,738,675 B2 * 5/2004 Dai ............................. 700/22
6,886,105 B2 * 4/2005 Kahn et al. ................. 713/323
7,007,183 B2 * 2/2006 Rawson, III ................ 713/324
7,173,347 B2 * 2/2007 Tani et al. .................. 307/10.1
7,340,620 B2 * 3/2008 Dove .......................... 713/300

OTHER PUBLICATIONS

Hyewon Jun et al., "Trading latency for energy in wireless ad hoc networks using message ferrying", Third IEEE International Conference on Pervasive Computing and Communications Workshops, Mar. 8-12, 2005, pp. 220-225.*
Lin Gu et al., "Radio-triggered wake-up capability for sensor network", 10th IEEE Real-Time and Embedded Technology and Applications Symposium, May 25-28, 2004, pp. 27-36.*
Zheng et al., "On-demand power management for ad hoc networks", INFOCOM 2003. Twenty-Second Annual Joint Conference of the IEEE Computer and Communications Societies. vol. 1, Mar. 30-Apr. 3, 2003, pp. 481-491.*
Ramanathan et al., "An analysis of system level power management algorithms and their effects on latency", IEEE Transactions on Computer-Aided Design of Integrated Circuits and Systems, vol. 21, Issue 3, Mar. 2002, pp. 291-305.*
Sivalingam et al., "Low power link and access protocols for wireless multimedia networks", IEEE 47th Vehicular Technology Conference, vol. 3, May 4-7, 1997, pp. 1331-1335.*

* cited by examiner

Primary Examiner—Crystal Barnes-Bullock
(74) Attorney, Agent, or Firm—Kevin A. Reif

(57) ABSTRACT

In some embodiments, a power manager may be coupled to a load circuit and configured to receive an input signal indicating a line disturbance on a power supply line and to reduce a load requirement of the load circuit in accordance with the received signal. The power manager may be configured to selectively reduce power to components with low entrance latency while continuing to provide full power to components with high entrance latency. Other embodiments are disclosed and claimed.

28 Claims, 6 Drawing Sheets

POWER MANAGER WITH SELECTIVE LOAD REDUCTION

The invention relates to power management. More particularly, some embodiments of the invention relate to a power manager with selective load reduction.

BACKGROUND AND RELATED ART

A power supply powered from the utility grid is susceptible to disturbances on the utility voltage, which includes, for example, brown outs and line outages. In some applications, it may be preferable for a power supply to continue to deliver output power even when the input voltage has dropped to zero for one fundamental line cycle (e.g. about 16 msec at 60 Hz and about 20 msec at 50 Hz). Capacitors may be used as energy storage elements to provide power during disturbances on the power line. In general, more capacitance is required with higher output power and higher minimum voltage requirements.

Power conversion losses may account for about 50% of the wattage utilized in modern day data centers resulting in reduced server density and low rack utilization. Overall the power and cooling capacity available to silicon loads for information processing is greatly reduced which in turn increases the total cost of ownership (TCO) of data centers. Efficient power delivery may be important to reduce power consumption, increase server density and also provide increased MIPS/watt metric for server applications.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
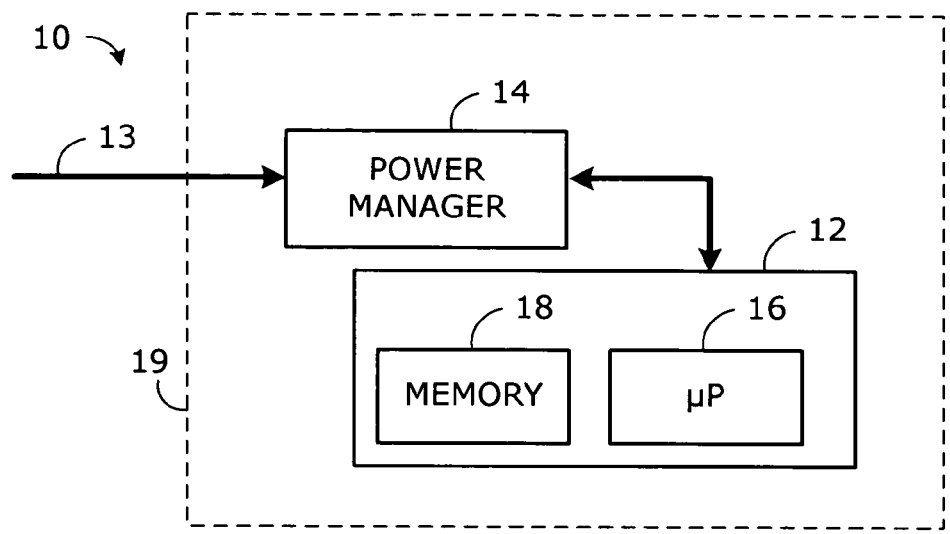
FIG. 1 is a block diagram of an electronic device utilizing power management in accordance with some embodiments of the present invention.

With reference to FIG. 1, an electronic device 10 may include a load circuit 12 and a power manager 14 coupled to the load circuit 12 and configured to receive an input signal 13 indicating a line disturbance on a power supply line and to reduce a load requirement of the load circuit 12 in accordance with the received signal 13. For example, the power manager 14 may be configured to selectively reduce power to components with low entrance latency while continuing to provide full power to components with high entrance latency.

For example, the components with low entrance latency may include a processor 16 and a memory 18. For example, the load circuit 12 may be configured to cause a state of the processor 16 to be saved and to cause the processor 16 to be placed in a reduced power state and to cause the memory 18 to be placed in a self-refresh state. In some embodiments, the power manager 14 and the load circuit 12 may be integrated on a same circuit substrate 19 (e.g. a same printed circuit board or a same integrated circuit die). In embodiments where the load circuit 12 includes the processor 16, the power manager 14 may be implemented utilizing the processor 16.

For example, the signal 13 indicating a line disturbance (e.g. the line disturbance may include a power outage condition or a brown out condition) may be generated in many different ways. For example, a sliding root mean square (RMS) calculation may be performed on the input voltage, which may be particularly well suited to tracking an AC input voltage. In some embodiments, the line disturbance signal may be provided in accordance with an adaptive algorithm. For example, an adaptive algorithm may be utilized to track the input signal (e.g. an input voltage) and provide the line disturbance signal (thereby initiating the transition to a lower load state) when the input signal is below a set level determined in accordance with a long term average of the input signal (e.g. as opposed to some fixed input level).

For example, the adaptive algorithm may start with a nominal standard level and then allow the power manager to be taught an appropriate trip level (e.g. based on a history of prior power sags and required load reductions). For example, the adaptive algorithm may further include an adaptive hysteresis to allow for tuning the relationship between entry and exit of the reduced load state. The adaptive algorithm may further allow for adjustment to application and OS requirements.

Figure 2:
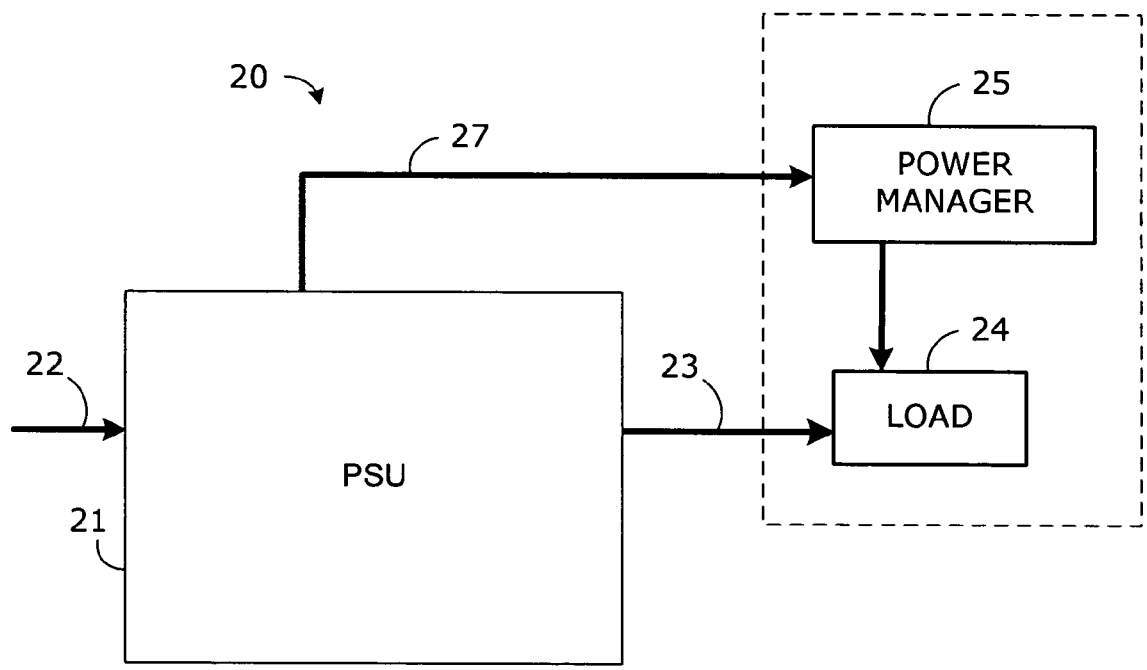
FIG. 2 is a block diagram of an electronic system in accordance with some embodiments of the present invention.

With reference to FIG. 2, an electronic system 20 may include a power supply unit 21 connected to a power line 22 and providing an output power signal 23, a load circuit 24 connected to the power supply unit 21, and a power manager 25 coupled to the power supply unit 21 and the load circuit 24. The power manager 25 may be configured to reduce a load requirement of the load circuit 24 in response to a power disturbance signal 27 received from the power supply unit 21. For example, the power manager 25 may be configured to selectively reduce power to components with low entrance latency in accordance with the power disturbance signal 27 while continuing to provide full power to components with high entrance latency. For example, the power disturbance signal may correspond to a power outage condition or a brown out condition. In some embodiments, the power disturbance signal may be provided in accordance with an adaptive algorithm.

For example, the components with low entrance latency may include a processor and a memory. For example, the load circuit 24 may be configured to cause a state of the processor to be saved and to cause the processor to be placed in a reduced power state and to cause the memory to be placed in a self-refresh state. In some embodiments, the power manager 25 and the load circuit 24 may be integrated on a same circuit substrate. In embodiments where the load circuit 24 includes a processor, the power manager 25 may be implemented utilizing the processor. For example, in a computer system, the power manager 25 may be implemented in hardware, software, and/or firmware, on a same core or on different cores. The power manager 25 may be part of a main host or a partition host. The power manager 25 may be implemented with a micro-controller or other electronic device (e.g. a board management controller). The power manager 25 may be implemented in or have aspects that are part of the computer system BIOS.

Advantageously, the power supply unit 21 may include a relatively small storage element in accordance an anticipated reduced load condition during a power disturbance event. In some embodiments, the power supply unit 21 may include an AC/DC converter and an isolated DC/DC converter (e.g. regulated or unregulated). In some embodiments, the power supply unit 21 may include a single conversion stage (e.g. only the AC/DC converter). The system 20 may further include a voltage regulator coupled between the power supply unit 21 and the load circuit 24.

Some embodiments of the invention may scale to smaller or larger applications. For example, in a data center system 20, a centralized data center controller may include the power manager 25 configured to receive the signal 27 from the power supply unit 21. For example, the power supply unit 21 may include an uninterruptible power supply (UPS) 21. The UPS 21 may provide an appropriate signal 27 to the power manager 25 upon sensing a line outage or other line disturbance. For example, the load 24 may include most or all of the power consumption for the entire data center. At a larger scale, the data center may include components with relatively lower entrance latency (e.g. server boxes) and components with relatively higher entrance latency (e.g. storage units). The power manager 25 may be configured to selectively reduce power to components with low entrance latency while continuing to provide full power to components with high entrance latency. Advantageously, the power manager 25 may reduce power consumption by the load 24 during the line disturbance event, thereby reducing the energy storage requirement in the UPS 21 (e.g. fewer or lower capacity batteries).

Figure 3:
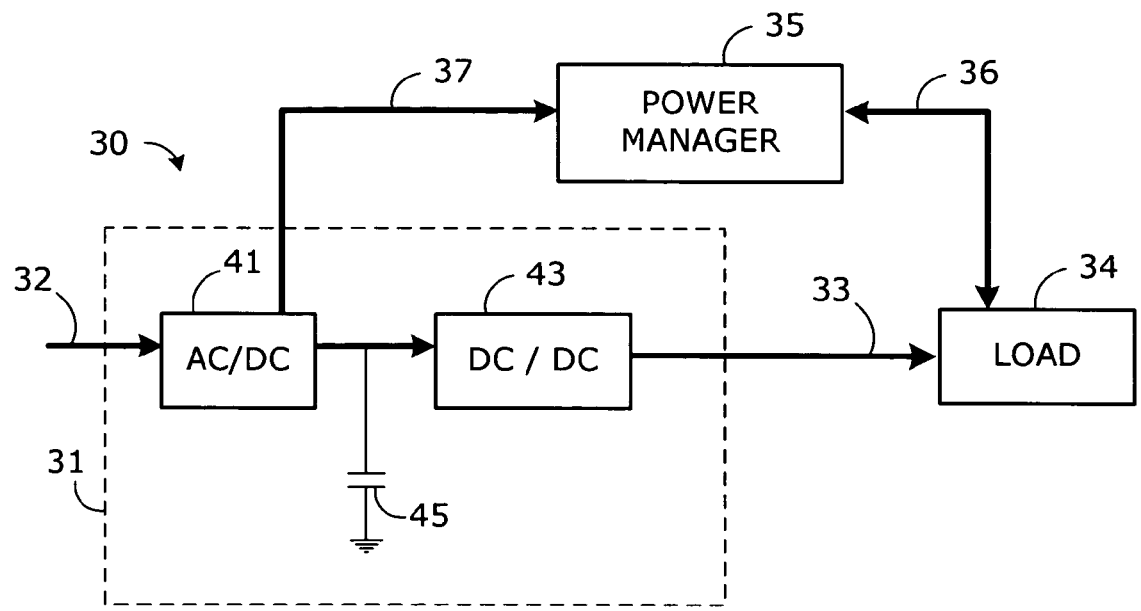
FIG. 3 is a block diagram of another electronic system in accordance with some embodiments of the present invention.

With reference to FIG. 3, an electronic system 30 may include a power supply unit 31 connected to a power line 32 and providing an output power signal 33, a load circuit 34 connected to the power supply unit 31, and a power manager 35 coupled to the power supply unit 31 and the load circuit 34. The power manager 35 may be configured to reduce a load requirement of the load circuit 34 in response to a power disturbance signal 37 received from the power supply unit 31. For example, the power manager 35 may be configured to selectively reduce power to components with low entrance latency in accordance with the power disturbance signal 37 while continuing to provide full power to components with high entrance latency. For example, the selective power reduction may pause platform execution without disrupting workloads running on the system and may be seamless to users, applications and/or the OS. For example, the power disturbance signal may correspond to a power outage condition or a brown out condition. In some embodiments, the power disturbance signal may be provided in accordance with an adaptive algorithm.

For example, the components with low entrance latency may include a processor and a memory. For example, the load circuit 34 may be configured to cause a state of the processor to be saved and to cause the processor to be placed in a reduced power state and to cause the memory to be placed in a self-refresh state. In some embodiments, the power manager 35 and the load circuit 34 may be integrated on a same circuit substrate as illustrated by arrow 36. In embodiments where the load circuit 34 includes a processor, the power manager 35 may be implemented utilizing the processor. For example, in a computer system, the power manager 35 may be implemented in hardware, software, and/or firmware, on a same core or on different cores. The power manager 35 may be part of a main host or a partition host. The power manager 35 may be implemented in or have aspects that are part of the computer system BIOS.

The power supply unit 31 may include an AC/DC converter 41 coupled to the input power line 32 and providing an output to a DC/DC converter 43. The DC/DC converter 43 may provide the output signal 33 for the power supply unit 31. For example, the DC/DC converter may be a regulated, isolated DC/DC converter. An energy storage element (e.g. a capacitor) 45 is connected to an output of the AC/DC converter 41.

Advantageously, some embodiments of the invention utilize power management to reduce or minimize energy storage required in a power supply. For example, the power supply unit 31 may include a relatively small storage element in accordance an anticipated reduced load condition during a power disturbance event. For example, in some embodiments of the invention, a power supply and a platform power manager may work in concert such that the platform load is reduced by the power manager when the power supply signals a utility line outage event, thereby reducing the energy storage required in the power supply to meet ride-through requirements. Advantageously, some embodiments of the invention may reduce the cost and size of energy storage elements in the power supply, and consequently also the cost and size of the power supply. In some applications, utilizing the power manager may provide the opportunity to use a higher density, lower cost power supply in a computer platform.

By way of comparison, a conventional electrical installation may assume that the power supply needs to temporarily deliver substantially full output power during a line outage event. In contrast, in the system 30 the power supply 31 signals to the power manager 35 that a line outage event has occurred, and the power manager 35 may reduce the platform power requirement for the duration of the event (e.g. by signaling the load circuit 34). Because the platform power requirement is reduced during the line outage event, less energy is required to be stored in the power supply 31, reducing the capacitor size and cost.

Advantageously, in accordance with some embodiments, utilizing the power manager 35 may ensure that the system context is saved and platform power is reduced to a desired level. For a computer application, the power manager may initiate a new power state which may be called a forced sleep or pause state. For example, the forced pause state may be triggered in the load circuit 34 by the power manager 35 upon signaling a line outage event. For example, in the forced pause state components with higher power consumption and low entrance latency may be transitioned to low power states (e.g. CPU to C6 state and memory to self-refresh) while components that take longer to save their context and enter low power state (e.g hard disk drives) may remain active. As used herein, entrance latency refers to a time required to safely enter a reduced power state (for example, in a computer context, safely entering the reduced power state may involve first preserving data integrity).

Advantageously, in some embodiments, the forced pause state may be a platform level state requiring no support or interaction with the operating system (OS) or other software components on the system. For example, all system interrupts may be disabled when the platform enters the forced pause state, thereby causing all OS or other software components to simply stall during the forced pause state. If the power line disturbance is of very short duration, the forced pause state may not even be noticed by the user.

For example, in some applications the forced pause state overall entrance latency and/or power consumed may be specified to not exceed a desired time threshold and/or power level, respectively. In some applications, the platform may exit the forced pause state either through the power manager 35 receiving a signal from the power supply 31 that the line outage condition has been removed, or a full system reboot (in some applications these may be the only ways to exit the forced pause state).

Figure 4:
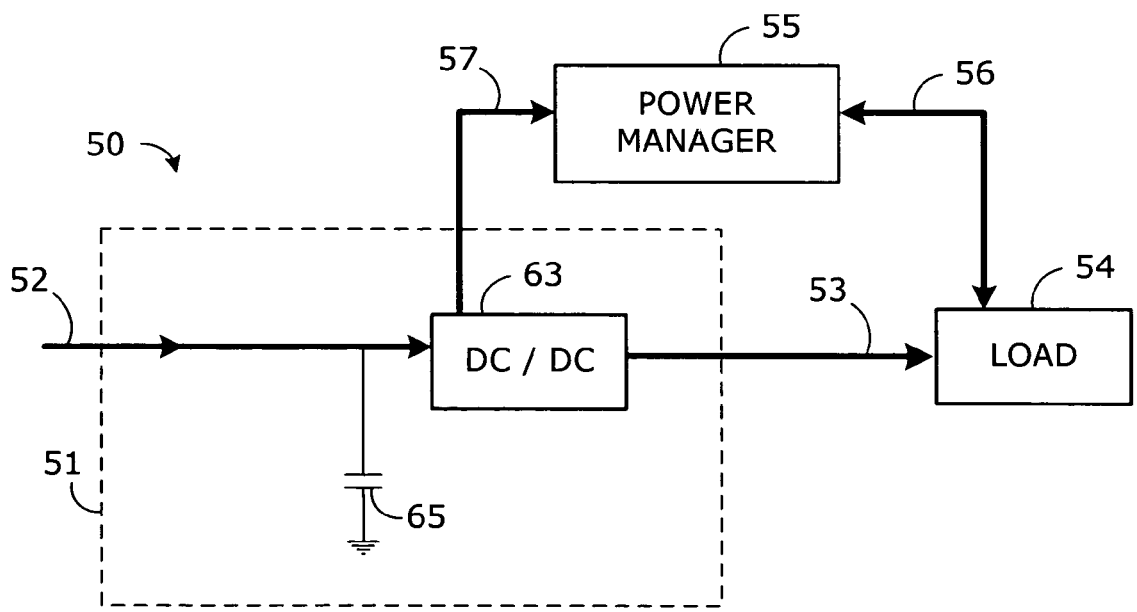
FIG. 4 is a block diagram of another electronic system in accordance with some embodiments of the present invention.

The power line connected to a power supply may provide alternating current (AC) or direct current (DC). With reference to FIG. 4, an electronic system 50 may include a power supply unit 51 connected to a DC power line 52 and providing an output power signal 53, a load circuit 54 connected to the power supply unit 51, and a power manager 55 coupled to the power supply unit 51 and the load circuit 54. The power manager 55, coupled to the load circuit 54 as illustrated by arrow 56, may be configured to reduce a load requirement of the load circuit 54 in response to a power disturbance signal 57 received from the power supply unit 51. For example, the power manager 55 may be configured to selectively reduce power to components with low entrance latency in accordance with the power disturbance signal 57 while continuing to provide full power to components with high entrance latency. For example, the power disturbance signal may correspond to a power outage condition or a brown out condition. In some embodiments, the power disturbance signal may be provided in accordance with an adaptive algorithm.

Because the power line 52 provides direct current (DC), the power supply unit 51 may omit the AC/DC converter and include only an isolated DC/DC converter 63. The DC/DC converter 63 may provide the output signal 53 for the power supply unit 51. For example, the DC/DC converter 63 may be a regulated, isolated DC/DC converter. An energy storage element (e.g. a capacitor) 65 may be connected to an input of the DC/DC converter 63.

For example, a conventional system which is required to deliver full load power $P_0$=500 W during a dropped power cycle time of $T_{50}$=20 msec may require a minimum of a 300 µF capacitor to provide the required energy storage, allowing the capacitor voltage to drop from a nominal value of $V_0$=400V to $V_1$=300V. In comparison, a system in accordance with some embodiments of the invention may reduce the load condition to a reduced platform power $P_r$=50 W after a delay time of $t_d$=5 msec. The minimum capacitor voltage may be calculated as follows:

$$\frac{1}{2}CV_0^2 - \frac{1}{2}CV_1^2 = P_o \times t_d + P_r \times (T_{50} - t_d)$$

$$\therefore V_1 = \sqrt{V_0^2 - 2\frac{P_o \times t_d + P_r \times (T_{50} - t_d)}{C}}$$

$$\therefore V_1 = \sqrt{400 \text{ V}^2 - 2\frac{500 \text{ W} \times 5 \text{ msec} + 50 \text{ W} \times (20 \text{ msec} - 5 \text{ msec})}{300 \text{ }\mu\text{F}}} = 372 \text{ V}$$

Alternatively, if the same minimum voltage requirement $V_{min}$ of 300 V is used, the minimum capacitance $C_{min}$ required for sufficient ride-through energy storage can be reduced as calculated below:

$$V_1 = \sqrt{V_0^2 - 2\frac{P_o \times t_d + P_r \times (T_{50} - t_d)}{C}} > V_{min}$$

$$\therefore 2\frac{P_o \times t_d + P_r \times (T_{50} - t_d)}{C} < V_0^2 - V_{min}^2$$

$$\therefore C > 2\frac{P_o \times t_d + P_r \times (T_{50} - t_d)}{V_0^2 - V_{min}^2}$$

$$\therefore C_{min} = 2\frac{500 \text{ W} \times 5 \text{ msec} + 50 \text{ W} \times (20 \text{ msec} - 5 \text{ msec})}{400 \text{ V}^2 - 300 \text{ V}^2} = 93 \text{ }\mu\text{F}$$

Figure 5:
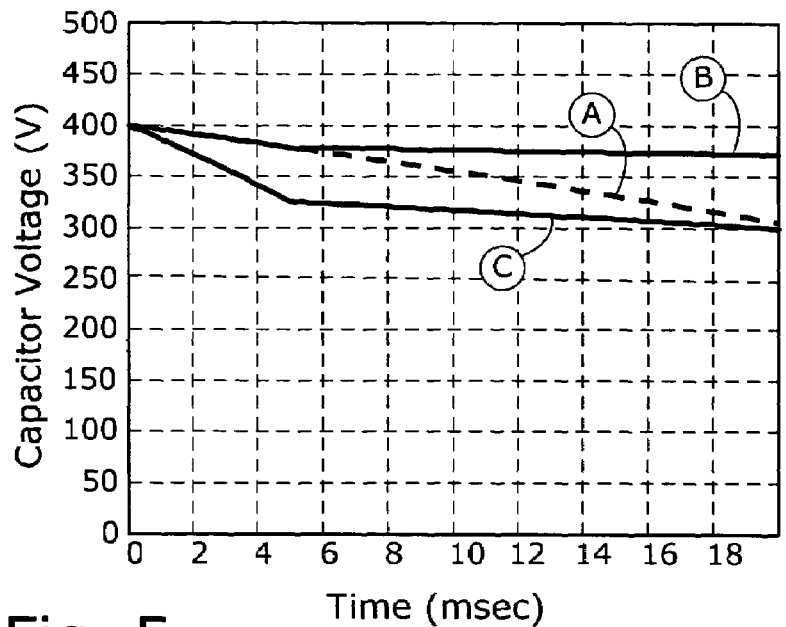
FIG. 5 is a comparison graph of capacitor voltage versus time, in accordance with some embodiments of the invention.

With reference to FIG. 5, the dashed line A corresponds to a conventional power supply configured to provide 500 W of ride-through power utilizing a 300 uF capacitor and maintaining a minimum capacitor voltage of 300 V for one dropped 50 Hz cycle (e.g about 20 msec). The solid line B corresponds to a power supply utilizing a power manager in accordance with some embodiments of the invention configured to provide 500 W of ride-through power for about 5 msec, and then a reduced load of about 50 W of ride-through power for the remainder of the dropped cycle (e.g. about 15 msec) utilizing a 300 uF capacitor. The solid line C corresponds to a power supply utilizing a power manager in accordance with some embodiments of the invention configured to provide 500 W of ride-through power for about 5 msec, and then a reduced load of about 50 W for the remainder of the dropped cycle (e.g. about 15 msec) utilizing a 93 uF capacitor and maintaining a minimum capacitor voltage of 300 V.

As can be seen from FIG. 5, the graph shows that with the same energy storage as used in a typical power supply (e.g. comparing line B to line A), the minimum capacitor voltage is significantly increased. Advantageously, the DC/DC converter can be made more efficient with higher minimum voltage $V_{min}$ requirements. Accordingly, the use of the power manager in some embodiments may provide a higher efficiency power supply unit. Higher efficiency may provide reduced cooling requirements for the power supply and the electronic system.

As can further be seen from FIG. 5, the graph shows that with the same minimum capacitor voltage (e.g. comparing line C to line A), the energy storage requirements are significantly reduced. Advantageously, the power supply may be made smaller and less costly with the reduced energy storage requirement. Accordingly, the use of the power manager in some embodiments may provide less expensive and smaller power supplies (e.g. a lower cost and higher density power supply).

As noted above, there may be a finite delay time $t_d$ involved between recognizing the power disturbance event and reducing the platform power requirement. In general, the shorter this time can be made, the larger the potential benefit. Also, in general, the lower the reduced platform power $P_r$ that can be achieved, the larger the benefit. Tradeoffs between the overall entrance latency and the potential power reduction may be considered when defining a forced pause power state for a particular application.

Figure 6:
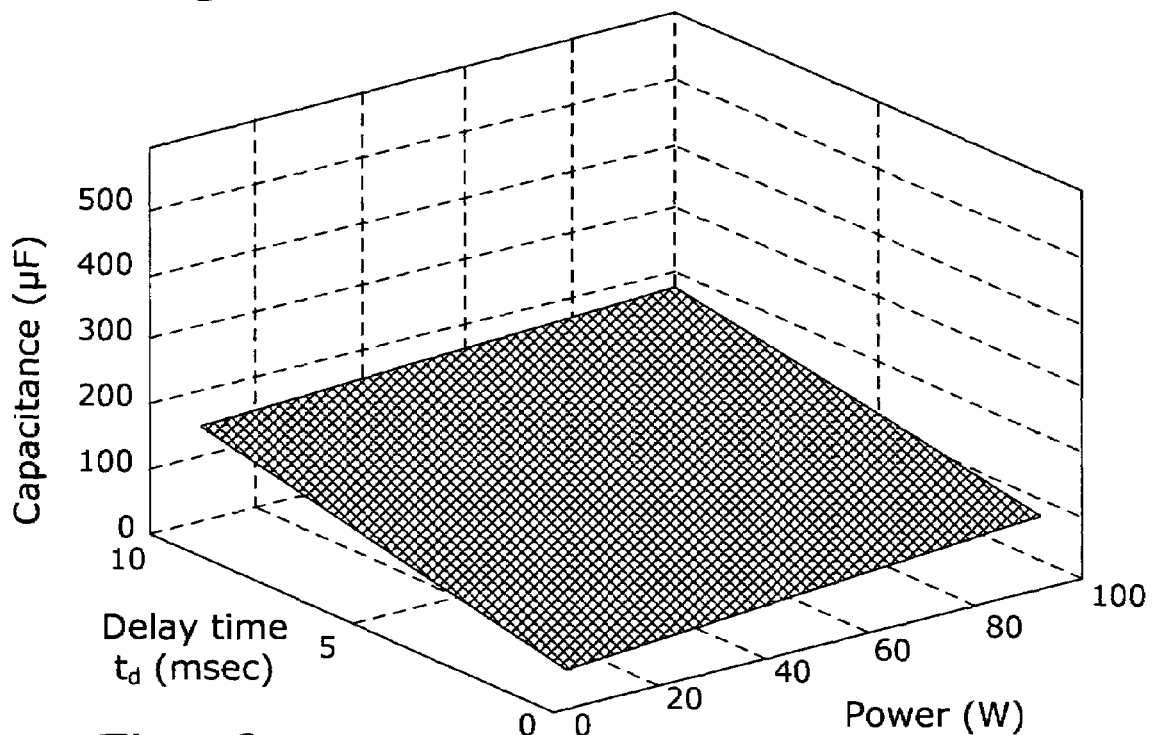
FIG. 6 is a three dimensional graph of nominal minimum capacitance for various delay times and power requirements, in accordance with some embodiments of the invention.

With reference to FIG. 6, a three dimensional (3D) graph shows example minimum capacitance requirements for a minimum capacitor voltage of 300V and a range of delay times and reduced power loads (based on a full load power of 500 W and a 50 Hz cycle). Other considerations, such as stability and bus voltage ripple, may also contribute to a desired minimum required capacitance. However these other considerations are generally lower than that required for ride-through, so reduction of the minimum capacitance requirement for ride-through will generally result in lower capacitance. Also, as noted above, in some applications a capacitance higher than the minimum required capacitance may be used in order to increase the minimum capacitor voltage and thereby enable a higher efficiency DC/DC design. Advantageously, by providing a lower capacitor value together with a higher minimum capacitor voltage, the use of the power manager in some embodiments may provide a higher efficiency, less expensive, and smaller power supply.

In most applications, a voltage source converter may be preferred because capacitors generally provide better energy storage than inductors. However, if the energy storage requirement is reduced, current source converters may be beneficial in some applications. Advantageously, some embodiments of the invention may provide reduced energy storage requirements, thereby opening up the possibility to use current source converters.

Figure 7:
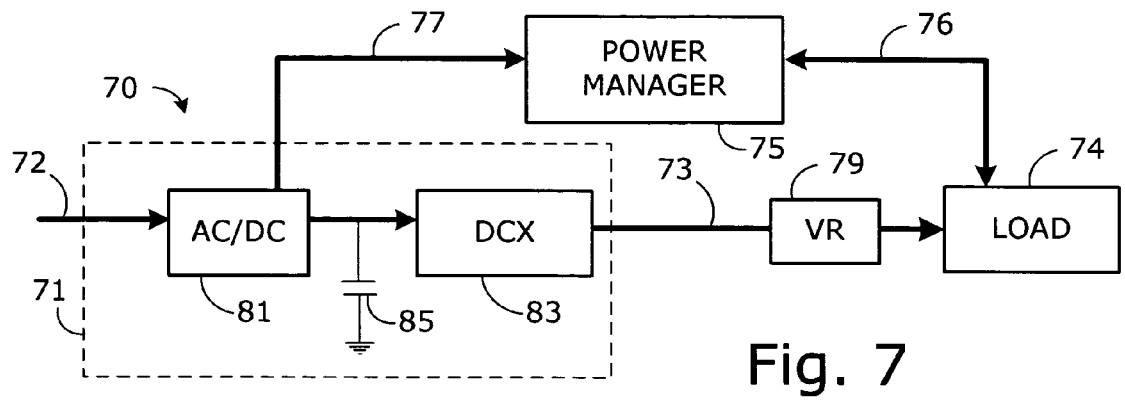
FIG. 7 is a block diagram of another electronic system in accordance with some embodiments of the present invention.

With reference to FIG. 7, an electronic system 70 may include a power supply unit 71 connected to a power line 72 and providing an output power signal 73, a load circuit 74 connected to the power supply unit 71, and a power manager 75 coupled to the power supply unit 71 and the load circuit 74. The power manager 75 may be configured to reduce a load requirement of the load circuit 74 in response to a power disturbance signal 77 received from the power supply unit 71. For example, the power manager 75 may be configured to selectively reduce power to components with low entrance latency in accordance with the power disturbance signal 77 while continuing to provide full power to components with high entrance latency. For example, the power disturbance signal may correspond to a power outage condition or a brown out condition. In some embodiments, the power disturbance signal may be provided in accordance with an adaptive algorithm.

For example, the components with low entrance latency may include a processor and a memory. For example, the load circuit 74 may be configured to cause a state of the processor to be saved and to cause the processor to be placed in a reduced power state and to cause the memory to be placed in a self-refresh state. In some embodiments, the power manager 75 and the load circuit 74 may be integrated on a same circuit substrate as illustrated by arrow 76. In embodiments where the load circuit 74 includes a processor, the power manager 75 may be implemented utilizing the processor. For example, in a computer system, the power manager 75 may be implemented in hardware, software, and/or firmware, on a same core or on different cores. The power manager 75 may be part of a main host or a partition host. The power manager 75 may be implemented in or have aspects that are part of the computer system BIOS.

The power supply unit 71 includes an AC/DC converter 81 coupled to the input power line 72 and providing an output to a DC/DC converter 83. The DC/DC converter 83 may provide the output signal 83 for the power supply unit 81. For example, the DC/DC converter 83 may be an unregulated, isolated DC/DC converter (also referred to as a DC transformer, interchangeably referred to herein as a 'DCX'). An energy storage element (e.g. a capacitor) 85 is connected to an output of the AC/DC converter 81. A voltage regulator 79 may be coupled between the output of the DCX 83 and the load circuit 74.

Figure 8:
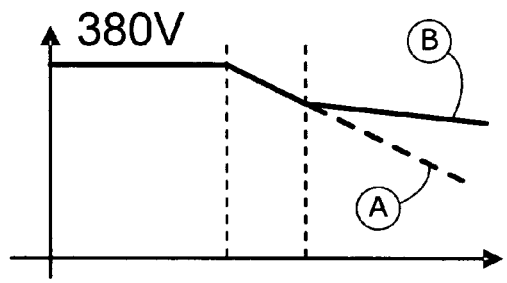
FIG. 8 is a comparison graph of voltage versus time, in accordance with some embodiments of the invention.
Figure 9:
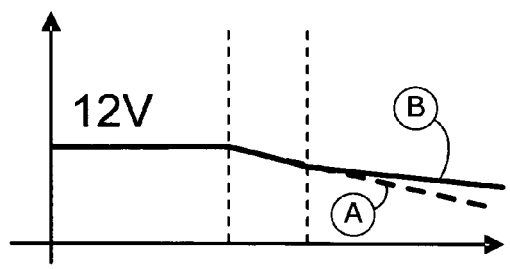
FIG. 9 is another comparison graph of voltage versus time, in accordance with some embodiments of the invention.

With reference to FIGS. 8 and 9, because a DCX does not provide regulation, the drop in capacitor voltage will be reflected directly on the output of the DCX, as shown for a conventional system by the dotted lines A in FIGS. 8 and 9. FIG. 8 corresponds to the input voltage of the DCX and FIG. 9 corresponds to the output voltage of the DCX. With the power manager of some embodiments of the invention, using the same amount of capacitance as in a conventional system, the minimum capacitance voltage may be increased (e.g. because the reduction in load by the power manager reduces the rate of discharge). Advantageously, with some embodiments of the power manager the DCX input voltage and therefore output voltage does not drop as low, as shown by solid lines B in FIGS. 8 and 9. Accordingly, some embodiments of the invention may allow the use of a high efficiency DCX in the power supply unit.

Figure 10:
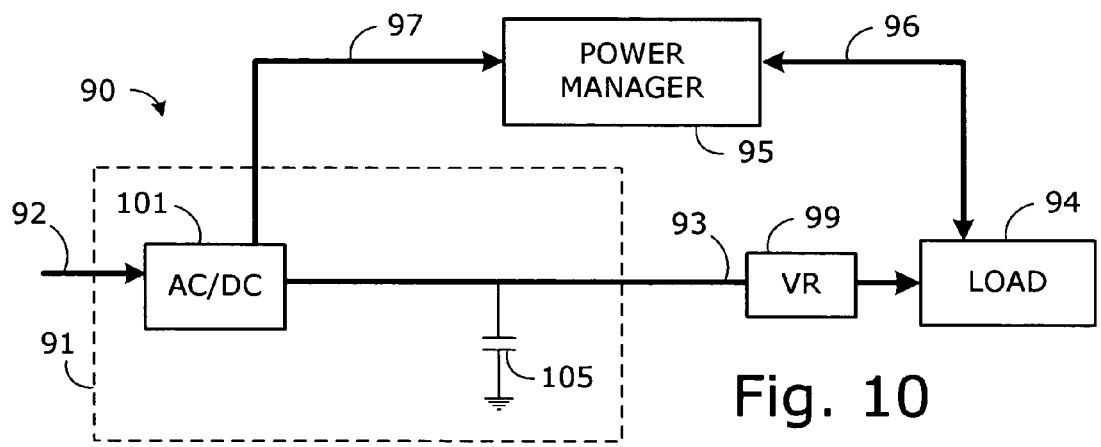
FIG. 10 is a block diagram of another electronic system in accordance with some embodiments of the present invention.

With reference to FIG. 10, an electronic system 90 may include a power supply unit 91 connected to a power line 92 and providing an output power signal 93, a load circuit 94 connected to the power supply unit 91, and a power manager 95 coupled to the power supply unit 91 and the load circuit 94. The power manager 95 may be configured to reduce a load requirement of the load circuit 94 in response to a power disturbance signal 97 received from the power supply unit 91. For example, the power manager 95 may be configured to selectively reduce power to components with low entrance latency in accordance with the power disturbance signal 97 while continuing to provide full power to components with high entrance latency. For example, the power disturbance signal may correspond to a power outage condition or a brown out condition. In some embodiments, the power disturbance signal may be provided in accordance with an adaptive algorithm.

For example, the components with low entrance latency may include a processor and a memory. For example, the load circuit 94 may be configured to cause a state of the processor to be saved and to cause the processor to be placed in a reduced power state and to cause the memory to be placed in a self-refresh state. In some embodiments, the power manager 95 and the load circuit 94 may be integrated on a same circuit substrate as illustrated by arrow 96. In embodiments where the load circuit 94 includes a processor, the power manager 95 may be implemented utilizing the processor. For example, in a computer system, the power manager 95 may be implemented in hardware, software, and/or firmware, on a same core or on different cores. The power manager 95 may be part of a main host or a partition host. The power manager 95 may be implemented in or have aspects that are part of the computer system BIOS.

The power supply unit 91 includes an AC/DC converter 101 coupled to the input power line 92 and providing the output signal 93 for the power supply unit 91. For example, the DC/DC converter may be omitted. An energy storage element (e.g. a capacitor) 105 is connected to an output of the AC/DC converter 101. A voltage regulator 99 may be coupled between the output of the AC/DC converter 101 and the load circuit 94.

Advantageously, the use of the power manager 95 in some embodiments may enable a power delivery architecture with a single conversion stage power supply unit 91. For example, some embodiments of the invention may provide a power delivery architecture including a single stage power supply with energy storage at low output voltage and a platform power manager which reduces the platform load when the power supply signals a utility line outage event. Advantageously, server systems using the power manager, according to some embodiments of the invention, may increase overall power delivery efficiency resulting in higher rack utilization, reduced TCO for data centers, and/or allowing a larger percentage of data center costs towards purchase of more resources.

In a conventional single conversion stage power supply, a large number of capacitors may be required to meet ride-through requirements, thus making the power supply large and expensive. Advantageously, using the power manager of some embodiments of the invention may reduce the energy storage requirements and, for a single conversion stage power supply, reduce the size and/or number of capacitors required to meet the reduced energy storage requirements.

For example, the capacitor reduction achievable may be determined by the delay time $t_d$ involved in recognizing the event and the power level $P_r$ to which the platform power can be reduced. With respect to a system having similar requirements as described above, which will draw full load power $P_0$=500 W during the delay time of $t_d$, and thereafter it only draws the reduced platform power $P_r$, the minimum capacitance $C_L^r$ using the power manager 95 may be calculated as follows:

$$\frac{1}{2}C_L^r V_{L0}^2 - \frac{1}{2}C_L^r V_{L1}^2 > P_o t_d + P_r(T - t_d)$$

$$\therefore C_L^r > \frac{2(P_o t_d + P_r(T - t_d))}{V_{L0}^2 - V_{L1}^2} = \frac{2(P_o t_d + P_r(T - t_d))}{V_{L0}^2(1 - (V_{L1}/V_{L0})^2)}$$

Figure 11:
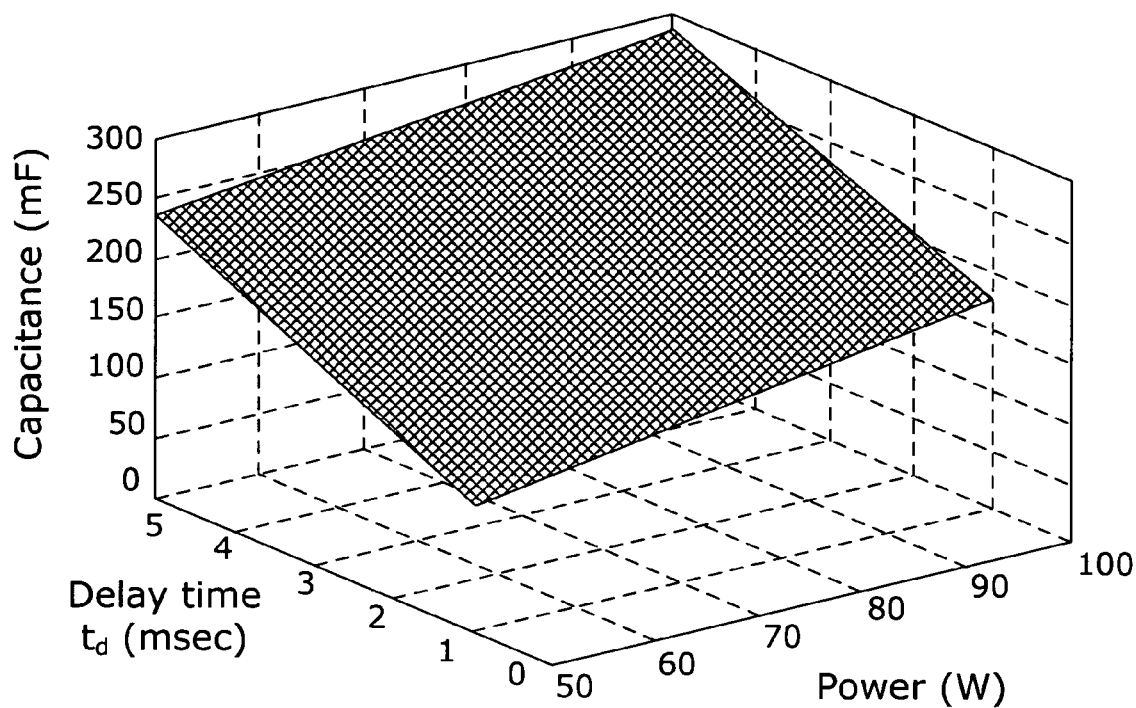
FIG. 11 is another three dimensional graph of nominal minimum capacitance for various time delays and power requirements, in accordance with some embodiments of the invention.

With reference to FIG. 11, the minimum capacitance as a function of the delay time (e.g. $t_d$) and reduced platform power $P_r$ is shown for $V_{L1}/V_{L0}$=0.9 (i.e. the output voltage is allowed to drop by 10% during the outage). Similar calculations may show that the capacitance required for the conventional system is about 730 mF, so a significant reduction in capacitance may be provided using the power manager in accordance with some embodiments of the invention. As noted above, greater reduction may be achieved for lower $P_r$ and lower $t_d$.

The ratio of the capacitance $C_L^r$ required at the low voltage output with the power manager, to the capacitance C required at the high voltage in a typical system without the power manager, may be calculated as follows:

$$\frac{C_L^r}{C} = \frac{2(P_o t_d + P_r(T - t_d))}{V_{L0}^2(1 - (V_{L1}/V_{L0})^2)} \times \frac{V_0^2 - V_1^2}{2 \times P_o \times T}$$

$$\therefore \frac{C_L^r}{C} = \frac{2P_o(t_d + P_r/P_o(T - t_d))}{V_{L0}^2(1 - (V_{L1}/V_{L0})^2)} \times \frac{V_0^2(1 - (V_1/V_0)^2)}{2 \times P_o \times T} =$$

$$\frac{(t_d + P_r/P_o(T - t_d))}{T} \times \frac{V_0^2}{V_{L0}^2} \times \frac{1 - (V_1/V_0)^2}{1 - (V_{L1}/V_{L0})^2}$$

The ratio of the number of capacitors of the same form factor at low voltage $N_L^r$ to the number required at high voltage N can be estimated as follows:

$$\frac{N_L^r}{N} = \frac{C_L^r}{C} \times \frac{1}{k_c}$$

Where $k_c$ is the ratio of maximum capacitance available at 16V (typical rating for 12V rail) to that at 450V (typical rating for 400V rail), and is typically ~150. Without use of a power manager, this ratio is typically about 13, i.e. you would need 13 times the number of capacitors of the same size at the low voltage output of a single stage converter than the number of capacitors needed at the high voltage input of the DC/DC converter in a conventional design.

Figure 12:
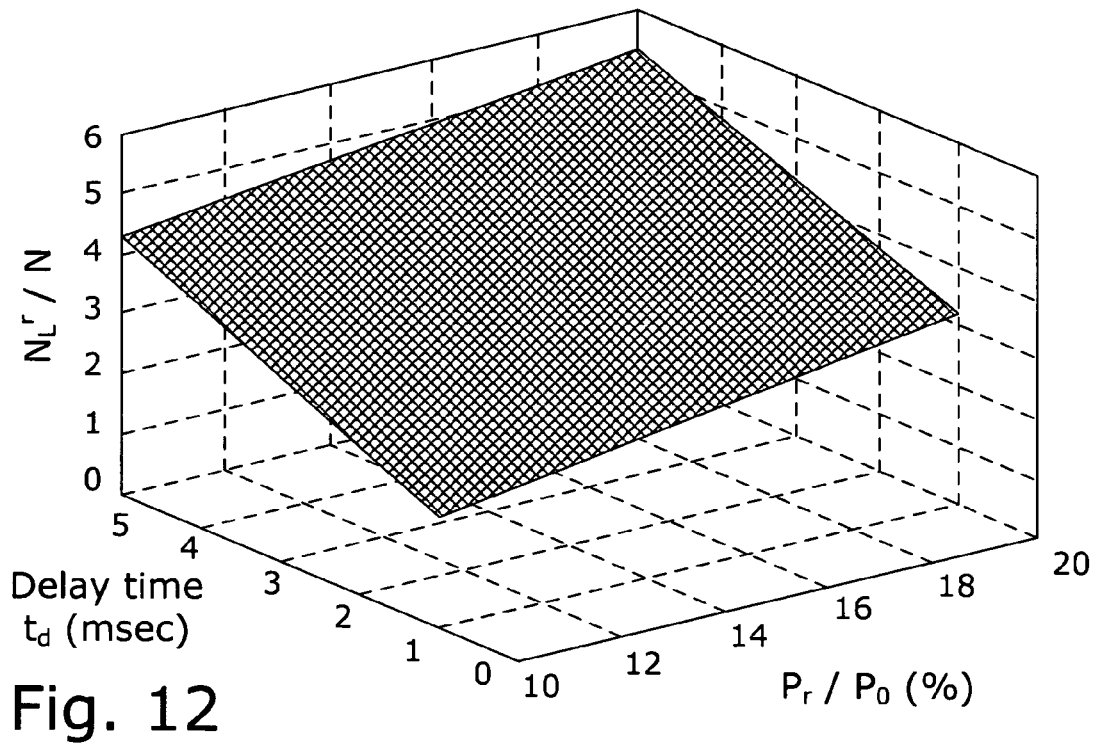
FIG. 12 is a three dimensional graph of a ratio of the number of capacitors for various time delays and power ratio, in accordance with some embodiments of the invention.

With reference to FIG. 12, a comparison graph is plotted for $V_1/V_0$=300V/380V and $V_{L1}/V_{L0}$=0.9. As can be seen from FIG. 12, with a low enough delay time and with the platform power reduced significantly, the number of capacitors required can be reduced to a factor of two (2) with the power manager in some embodiments of the invention as compared to the number of capacitors required to store energy at high voltage in a conventional design. Because only a single converter may be utilized in the power supply unit 91, the physical size of the power supply unit 31 may be reduced.

In some applications, the output capacitance is not only determined by the hold-up time requirement, although traditionally this term has dominated. Assuming the minimum calculated capacitance for $C_L^r$ of 100 mF, the peak to peak line frequency ripple is:

$$v_{pp} \approx \frac{P_0}{\omega C_L^r V_{L0}} = \frac{500 \text{ W}}{2\pi \times 50 \text{ Hz} \times 100 \text{ mF} \times 12 \text{ V}} = 1.33 \text{ V}$$

For the above example, this is about 11% ripple. This may be more ripple than is desirable in some applications. Therefore, with the power manager 95, there may be trade-offs for the capacitance requirement that may be driven by line frequency ripple requirements as well as energy storage requirements. Some embodiments of the invention may utilize the voltage regulator 99 to address line frequency ripple.

Figure 13:
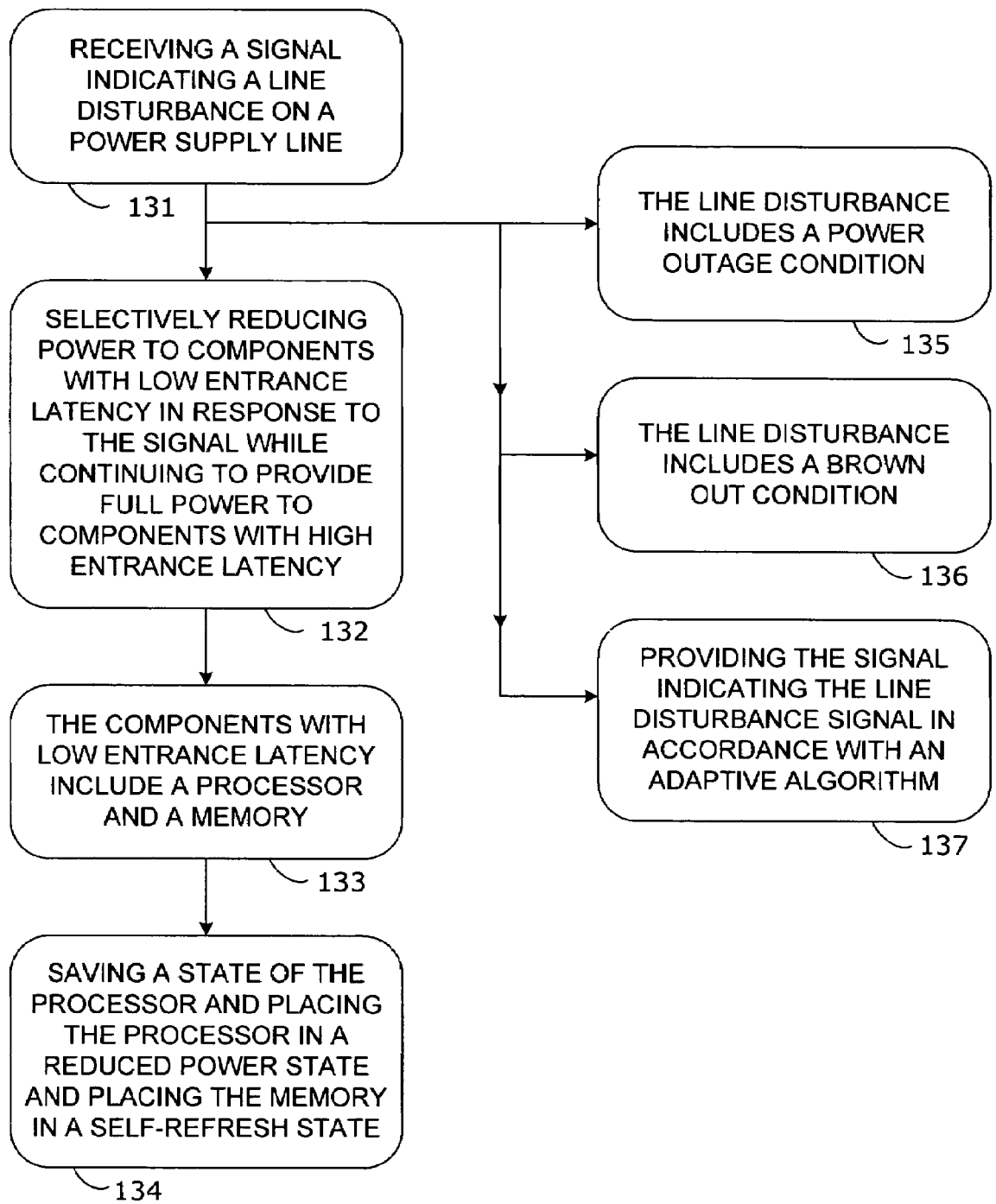
FIG. 13 is a flow diagram in accordance with some embodiments of the invention.

With reference to FIG. 13, some embodiments of the invention involve receiving a signal indicating a line disturbance on a power supply line (e.g. at block 131), and selectively reducing power to components with low entrance latency in response to the signal while continuing to provide full power to components with high entrance latency (e.g. at block 132). For example, the components with low entrance latency may include a processor and a memory (e.g. at block 133). Some embodiments may further involve saving a state of the processor and placing the processor in a reduced power state and placing the memory in a self-refresh state (e.g. at block 134). For example, the line disturbance may include a power outage condition (e.g. at block 135) or a brown out condition (e.g. at block 136). Some embodiments may further involve providing the signal indicating the line disturbance signal in accordance with an adaptive algorithm (e.g. at block 137).

Those skilled in the art will appreciate that the flow diagram of FIG. 13 may be implemented in any of a number of arrangements of hardware, software, and/or firmware. For example, the flow diagram may be completely implemented by special purpose hardware circuits. Alternatively, the flow diagram may be completely implemented by software running on a general purpose processor. Alternatively, the flow diagram may be selectively partitioned between special purpose hardware and software running on a general purpose processor.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. An apparatus, comprising:
   a load circuit; and
   a power manager coupled to the load circuit and configured to receive an input signal indicating a line disturbance on a power supply line and to reduce a load requirement of the load circuit in accordance with the received signal, wherein the power manager is configured to selectively reduce power to components with low entrance latency while continuing to provide full power to components with high entrance latency.

2. The apparatus of claim 1, wherein the components with low entrance latency include a processor and memory.

3. The apparatus of claim 2, wherein the power manager is configured to cause a state of the processor to be saved and the processor to be placed in a reduced power state and to cause the memory to be placed in a self-refresh state.

4. The apparatus of claim 1, wherein the power manager and the load circuit are integrated on a same circuit substrate.

5. The apparatus of claim 1, wherein the load circuit includes a processor and wherein the power manager is implemented utilizing the processor.

6. The apparatus of claim 1, wherein the line disturbance includes a power outage condition.

7. The apparatus of claim 1, wherein the line disturbance includes a brown out condition.

8. The apparatus of claim 1, wherein the line disturbance signal is provided in accordance with an adaptive algorithm.

9. A method, comprising:
   receiving a signal indicating a line disturbance on a power supply line; and
   selectively reducing power to components with low entrance latency in response to the signal while continuing to provide full power to components with high entrance latency.

10. The method of claim 9, wherein the components with low entrance latency include a processor and a memory.

11. The method of claim 10, further comprising:
    saving a state of the processor and placing the processor in a reduced power state and placing the memory in a self-refresh state.

12. The method of claim 9, wherein the line disturbance includes a power outage condition.

13. The method of claim 9, wherein the line disturbance includes a brown out condition.

14. The method of claim 9, further comprising:
    providing the signal indicating the line disturbance signal in accordance with an adaptive algorithm.

15. A system, comprising:
    a power supply unit;
    a load circuit connected to the power supply unit; and
    a power manager coupled between the power supply unit and the load circuit, wherein the power manager is configured to reduce a load requirement of the load circuit in response to a power disturbance signal received from the power supply unit,
    and wherein the power manager is configured to selectively reduce power to components with low entrance latency in accordance with the power disturbance signal while continuing to provide full power to components with high entrance latency.

16. The system of claim 15, wherein the components with low entrance latency include a processor and a memory.

17. The system of claim 16, wherein the power manager is configured to cause a state of the processor to be saved and the processor to be placed in a reduced power state and to cause the memory to be placed in a self-refresh state.

18. The system of claim 15, wherein the power manager and the load circuit are integrated on a same circuit substrate.

19. The system of claim 15, wherein the load circuit includes a processor and wherein the power manager is implemented utilizing the processor.

20. The system of claim 15, wherein the power disturbance signal corresponds to a power outage condition.

21. The system of claim 15, wherein the power disturbance signal corresponds to a brown out condition.

22. The system of claim 15, wherein the power disturbance signal is provided in accordance with an adaptive algorithm.

23. The system of claim 15, wherein the power supply unit includes a relatively small storage element in accordance an anticipated reduced load condition during a power disturbance event.

24. The system of claim 15, wherein the power supply unit comprises an AC/DC converter and an unregulated, isolated DC/DC converter.

25. The system of claim 24, further comprising:
    a voltage regulator coupled between the power supply unit and the load circuit.

26. The system of claim 15, wherein the power supply unit comprises a single conversion stage.

27. The system of claim 26, further comprising:
    a voltage regulator coupled between the power supply unit and the load circuit.

28. The system of claim 15, wherein the power supply unit comprises an uninterruptible power supply.

* * * * *